United States Patent [19]
Adcock

[11] Patent Number: 5,311,909
[45] Date of Patent: May 17, 1994

[54] FLEXIBLE HOSE STABILIZING DEVICE

[76] Inventor: John R. Adcock, 1605 Stanolind, Midland, Tex. 79705

[21] Appl. No.: 43,754

[22] Filed: Apr. 7, 1993

Related U.S. Application Data

[63] Continuation-in-part of Ser. No. 962,734, Oct. 19, 1992, abandoned.

[51] Int. Cl.$^5$ .............................................. A01G 25/09
[52] U.S. Cl. .................................... 137/899; 248/76; 248/80
[58] Field of Search .................. 137/343, 899; 248/75, 248/76, 80

[56] References Cited

U.S. PATENT DOCUMENTS

| | | | |
|---|---|---|---|
| 587,775 | 8/1897 | Yockel | 248/75 |
| 601,639 | 4/1898 | Doyle | 248/76 |
| 735,799 | 8/1903 | McGill . | |
| 865,184 | 9/1907 | Kenlon . | |
| 872,490 | 12/1907 | Williamson et al. | 248/75 |
| 3,496,959 | 2/1970 | Wolfe et al. . | |
| 3,572,622 | 3/1971 | Smith . | |
| 3,734,138 | 5/1973 | Brown et al. . | |
| 3,809,348 | 5/1974 | Di Laura . | |
| 3,819,137 | 6/1974 | Smith . | |
| 4,169,571 | 10/1979 | Duggan . | |
| 4,470,177 | 9/1984 | Ganung et al. . | |
| 5,000,405 | 3/1991 | Rybak et al. . | |
| 5,023,959 | 6/1991 | Mercer . | |
| 5,033,702 | 7/1991 | Robbins . | |

Primary Examiner—A. Michael Chambers
Attorney, Agent, or Firm—Joseph S. Presta

[57] ABSTRACT

A hose stabilizing device for a recreational vehicle sewage hose or the like, which includes a body member having a hose receiving opening and an internal chamber therein. The device is selectively movable between an open condition, wherein the hose may be placed in the hose receiving opening, and a closed condition wherein the hose is clampingly held therein. The body member includes a filling device for enabling the internal chamber thereof to receive and hold a ballast material therein, thereby providing sufficient weight to stabilize the hose. The body member is constructed to enable the device to be securely connected adjacent an end of the hose, and either stood up on its side adjacent a sewage receiving inlet, or placed flat directly on top of the inlet such that the hose receiving opening is in alignment with the inlet, thereby stabilizing the end of the hose in proper communication with the inlet.

23 Claims, 2 Drawing Sheets

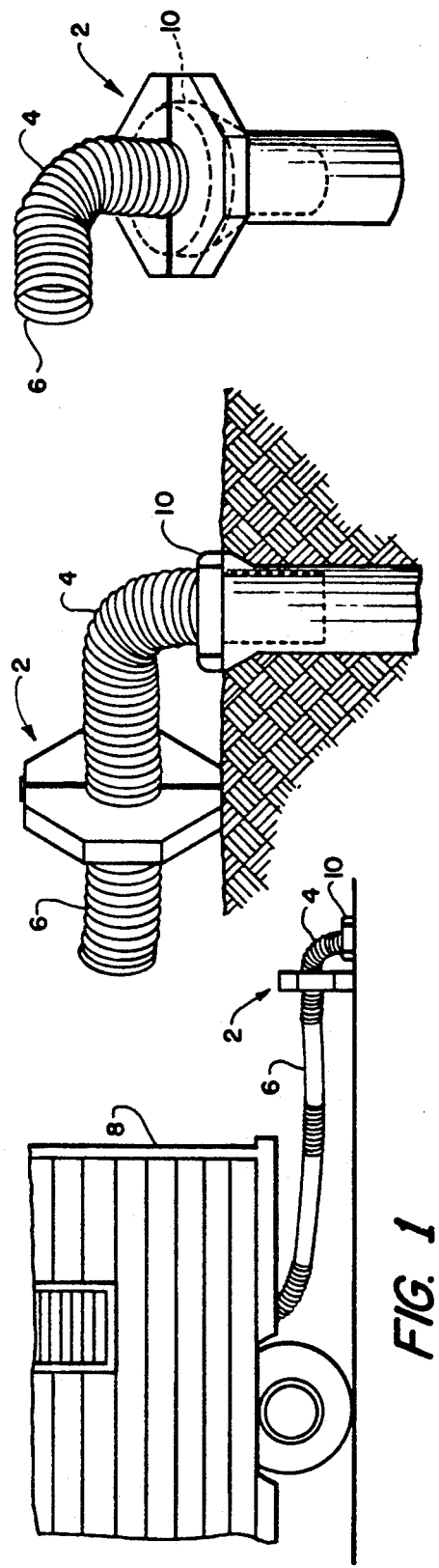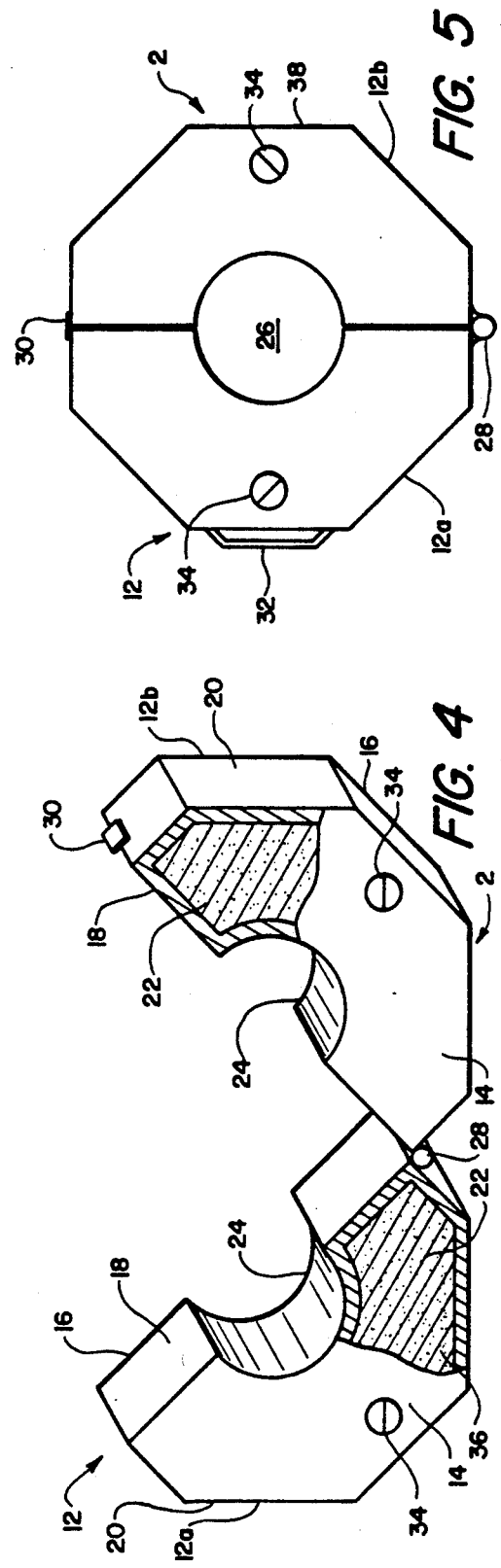

FLEXIBLE HOSE STABILIZING DEVICE

RELATED U.S. APPLICATION

This application is a continuation-in-part U.S. application of Ser. No. 07/962,734 filed Oct. 19, 1992, now abandoned.

BACKGROUND OF THE INVENTION

The present invention relates to a flexible hose stabilizing device and, more particularly, to a hose stabilizing device for use with a sewage hose of the type found on recreational vehicles or the like for securely maintaining the end of the hose in communication with a sewage receiving inlet.

Recreational vehicles such as motorized homes, trailers and campers are usually equipped with toilets, showers, sinks and the like from which sewage and other waste materials are discharged. Conventionally, such vehicles are equipped with sewage holding tanks which are operable to collect and temporarily store sewage and other waste materials. Due to the fact that such holding tanks have limited storage capabilities, they must be periodically emptied into an appropriate sewage disposal system. Conventionally, emptying of the holding tank is accomplished through the use of a flexible hose which is connected at one end to the tank while the other end is placed in communication with a sewage receiving inlet. Such sewage receiving inlets are commonly found at recreational vehicle parks or the like. The sewage receiving inlets are usually provided in the form of a pipe connected with an underground sewage disposal system, and having an opening which extends adjacent ground level for receiving a sewage hose.

In order to accommodate storage of the sewage hose in the recreational vehicle while not being used, such hoses are typically constructed to be both flexible and collapsible. Conventionally, the sewage hose is constructed with an embedded spring-like member therein which enables the hose to be longitudinally compressed and expanded to a desired length. Such sewage hose construction results in a hose which is quite flexible and unstable, which often makes it difficult to securely maintain the end thereof in communication with the sewage receiving inlet. Due to the "springy" nature of such a sewage hose, the end thereof often either comes out of the inlet, which results in raw sewage being spilled directly on the ground, or extends too far into the inlet, which results in the outer surface of the hose becoming soiled with sewage. Obviously, either one of these occurrences results in an undesirable and unsanitary condition.

Therefore, a need has been created for a simple, economical and effective device which can be used with a flexible hose to securely maintain the end of the hose in communication with a sewage receiving inlet, while also preventing the hose from extending too far into the inlet. The flexible hose stabilizing device of the present invention meets this need.

BRIEF DESCRIPTION OF THE RELATED ART

In the past, recreational vehicle owners have tried various techniques in an attempt to maintain the end of their sewage hose in proper communication with a sewage receiving inlet. One common technique has been to locate a suitable stone, and attempt to stabilize the end of the hose therewith by propping it against the hose at a point adjacent the inlet. While this technique may work satisfactorily in some instances, a suitable stone is often difficult and time-consuming to locate and manipulate into a secure position on the hose. Due to the varying sizes, shapes and weights of available stones, they rarely provide the desired level of hose stabilization which assures proper and sanitary waste disposal Moreover, once a suitable stone is located it is usually discarded when the recreational vehicle moves on to its next destination, because it is impractical to store and transport a large heavy stone in a recreational vehicle. As a result, the owner of the recreational vehicle is faced with the same cumbersome task of finding a means for securing his sewage hose at each new destination.

Various waste hose support devices are known in the art as evidenced by the patents to Di Laura U.S. Pat. No. 3,809,348, Smith No. 3,819,137 and Duggan No. 4,169,571. These devices are constructed to support the mid-section of waste hoses for the purpose of causing the hose to maintain a downward slope from the holding tank to the sewage inlet, thereby facilitating draining thereof. While such support devices help to stabilize the hose mid-section and maintain flow therethrough, they do not provide a simple and effective means for securely maintaining the end of the hose in the sewage inlet, while also preventing the hose form extending too far down into the inlet. Moreover, these and other similar support devices are cumbersome, expensive to manufacture and difficult to erect, disassemble and store.

The patent to Rybak et. al. U.S. Pat. No. 5,000,405 discloses a fire hose stabilizing device which is constructed to receive the end of a fire hose therein. The device has a hollow construction to enable a ballast material to be inserted therein, thereby providing weight to the device in order to keep the fire hose stationary. While this device may work to stabilize a fire hose, it is not suitable for use in stabilizing a flexible sewage hose because, in part, it has no means for securely connecting itself to a sewage hose.

The new and improved flexible hose stabilizing device of the present invention was developed to provide a hose stabilizing device which is particularly constructed for use with a recreational vehicle sewage hose or the like, and which overcomes the disadvantages of the known hose support devices hereinbefore described.

SUMMARY OF THE INVENTION

Accordingly, it is a primary object of the present invention to provide a simple, economical and effective hose stabilizing device which can quickly and easily be connected with a flexible hose for stabilizing the same.

Another object of the invention is to provide a hose stabilizing device which is operable to securely maintain the end of a recreational vehicle sewage hose in a sewage receiving inlet, and also prevent the hose from extending too far down into the inlet.

A further object of the present invention is to provide a hose stabilizing device which is light weight, thereby making it practical to transport, while also enabling the device to selectively receive and hold a ballast material therein for providing additional weight for stabilizing the hose.

Yet another object of the invention is to provide a hose stabilizing device which is operable to receive and hold therein a ballast material such as water, sand or the like.

These and other objects and advantages are attained by providing, in a preferred embodiment, a hose stabilizing device which includes a body member made up of a pair body portions having internal chambers, each body portion having a complementary cutout portion which together define a hose receiving opening in the body member, means for pivotally connecting the pair of body portions together such that the body member is selectively pivotable between an open condition, wherein the hose may be placed between the body portions, and a closed condition wherein the hose is clampingly held between the body portions in the hose receiving opening, and further wherein the body portions includes means for enabling the internal chambers thereof to be filled with a ballast material, thereby providing sufficient weight to stabilize the hose.

The hose stabilizing device of the present invention is constructed to enable the device to be securely connected adjacent an end of the hose, and either stood up on its side adjacent a sewage receiving inlet, or placed flat directly on the inlet such that the hose opening is in alignment with the inlet, thereby stabilizing the end of the hose in proper communication with the inlet.

DESCRIPTION OF THE DRAWINGS

Other objects and advantages of the subject invention will become apparent from a study of the following specification when viewed in light of the accompanying drawings, in which:

FIG. 1 is a side elevational view of the hose stabilizing device of the present invention in use on a recreational vehicle sewage hose FIG. 2 is an enlarged perspective view of the hose stabilizing device of FIG. 1.

FIG. 3 is a perspective view of the hose stabilizing device of the present invention lying flat on top of a sewage receiving inlet.

FIG. 4 is a perspective view, partially in section, of the hose stabilizing device of the present invention in an open condition.

FIG. 5 is a front plan view of the hose stabilizing device of FIG. 4 in a closed condition.

DETAILED DESCRIPTION

Figure 6:
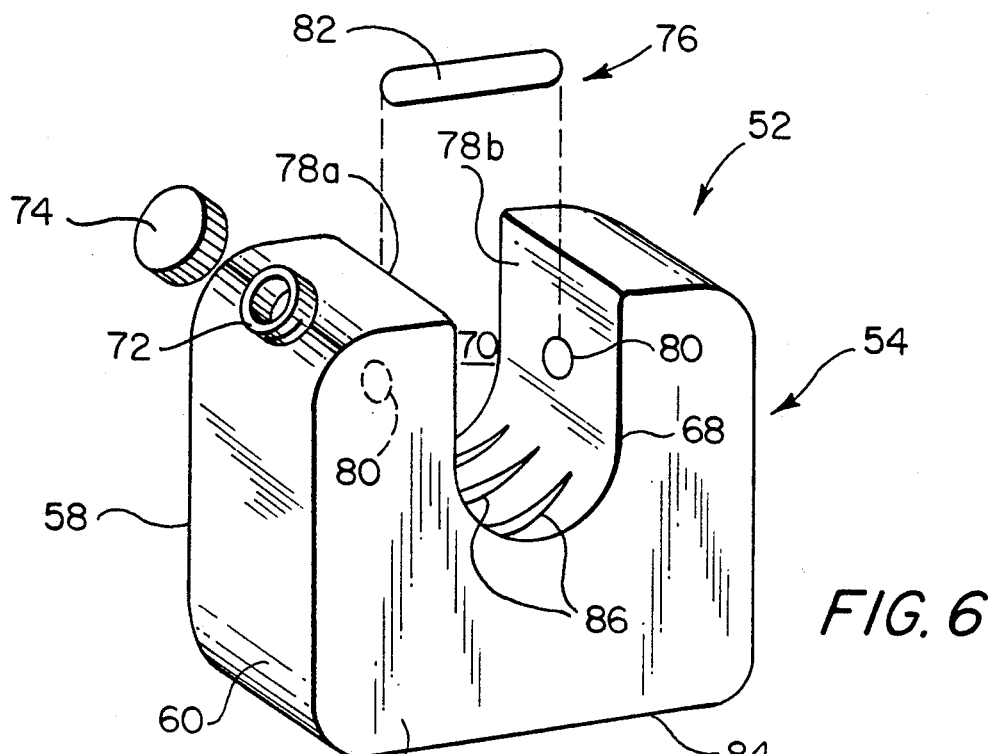
FIG. 6 is a perspective view of an alternative embodiment of the hose stabilizing device of the present invention.

Referring now to FIGS. 1 through 5, wherein like reference numerals designate similar parts throughout the various views, there is shown a preferred embodiment of the hose stabilizing device of the present invention generally designated by the numeral 2. While the hose stabilizing device 2 may be used to stabilize any type of suitable hose or the like, it has particular utility in stabilizing the end portion 4 of a sewage hose 6 of the type found on a recreational vehicle 8 which is used for emptying a sewage holding tank thereon into a sewage receiving inlet 10.

Referring now more particularly to FIGS. 4 and 5, the hose stabilizing device 2 includes a body member 12 which is made up of a pair of body portions 12a and 12b. The body portions 12a and 12b each include spaced front, back, inner and outer wall portions 14, 16, 18 and 20, respectively, which define an internal chamber 22 therebetween. The body portions 12a and 12b each include a cutout portion 24 adjacent the inner wall 18 thereof, which together define a hose receiving opening 26 in the body member 12. The body member 12 is preferably constructed of a plastic material, but any other suitable material such as vinyl, metal or the like may be used.

A hinge member 28 pivotally connects the pair of body portions 12a and 12b together adjacent one end thereof. The hinge member 28 enables the body member 12 to be selectively pivotable between the open condition of FIG. 4, wherein the hose 6 may be placed between the body portions 12a and 12b, and the closed condition of FIG. 5, wherein the inner walls 18 of the body members 12a and 12b are positioned adjacent one another and the hose 6 is clampingly held therebetween in the hose receiving opening 26. Preferably, the hinge member 28 is a pin-type hinge of known construction, but any other suitable hinge member may be used which is operable to enable the body member 12 to pivot between an open and closed condition. Preferably, the hinge member is constructed of stainless steal, plastic, brass or other material which is suitable for outdoor use.

Preferably, the hose receiving opening 26 is slightly smaller than the diameter of the hose 6, so that the body member 12 clamps securely around the hose 6. In order to achieve secure clamping, the diameter of the hose receiving opening 26 should be approximately one-eighth to one-quarter of an inch smaller than the diameter of the hose 6. Therefore, for use with a conventional three inch diameter hose 6, the hose receiving opening 26 should have diameter of approximately two and seven-eighths to two and three-quarters inches. Preferably, each of the body portions 12a and 12b are substantially identical in size and shape to one another, and the hose receiving opening 26 is centrally located in the body member 12 and circular in shape, wherein each cutout portion 24 defines half of the circular opening 26. The hose receiving opening 26 may includes a flexible liner member (not shown), such as a rubber liner or the like, which is compressed around the hose 6 when the body member 12 is in the closed condition, thereby enabling the body member to be easily and securely clamped thereon without damaging the hose. The walls of the hose receiving opening 26 or liner member (not shown) may have a shape which corresponds to the shape of the outer surface of the hose 6. For example, for use with a corrugated or ribbed-type hose, the walls of the opening 26 may have a corresponding corrugated or ribbed shape, thereby providing improved gripping of the hose 6 therein.

The body member 12 preferably includes means 30 for selectively locking the body member 12 in the closed condition. The locking means 30 may be in the from of a clasp, buckle, hook or any other suitable device of known construction which is operable to maintain the body member 12 securely in the closed condition. Preferably, the locking means 30 is constructed of plastic, stainless steal, brass or other material which is suitable for outdoor use. The body member 12 may also be provided with handle means 32 secured thereto, for enabling the body member 12 to be easily handled and moved from one location to another.

In accordance with the present invention, the body portions 12a and 12b include means 34 for enabling the internal chambers 22 thereof to receive and hold a ballast material 36 therein, thereby selectively providing additional weight to the body member 12 for stabilizing the hose 6. While in the preferred embodiment of the present invention both of the body portions 12a and 12b include means 34 for receiving a ballast material, it is considered within the scope of the present invention that only one of the body portions 12a or 12b may include such filling means 34. Preferably, the filling means 34 includes a screw-type plug member which screws in an opening in one of the walls of the body portion 12a or 12b, but any other suitable filling means may be used. The ballast material 36 is preferably sand, water, antifreeze liquid, or any other suitable material or mixture thereof, which will provide sufficient weight to stabilize the hose 6. In accordance with the invention, it has been found that approximately four pounds of ballast material will provide sufficient stabilization of a conventional sewage hose 6. However, the body member 12 may be provided in larger or smaller sizes, and be capable of holding various amounts of ballast material 36 in accordance with the size of the hose 6 and amount of stabilization desired. If water or other liquid is used as a ballast material, the internal chambers 22 of the body portions 12a and 12b and the filling means 34 should be constructed to be fluid-tight so that the ballast material does not leak therefrom.

Preferably, the body member 12 includes at least one perimeter portion 38 which is substantially flat, thereby enabling the body member 12 to stand upright on the flat portion 38. Preferably, each body portion 12a and 12b is constructed in the shape of a polygon, and the body member 12 has the shape of a octagon when in the closed condition. However, the body portions 12a and 12b may be constructed in any other suitable shape, and the body member 12 may have a shape which is square, triangular, hexagonal, circular or other suitable shape which is operable to stabilize the hose 6.

In operation, the hose stabilizing device 2 of the present invention is clamped onto the hose 6 at a suitable distance from the end 4 thereof to enable the hose end 4 to extend into the sewage receiving inlet 10. For a conventional sewage receiving inlet 10, the body member 12 should be positioned such that the end of the hose 6 extends approximately six to ten inches into the inlet 10. The weight of the body member 12 will then prevent the end 4 of the hose 6 from coming out of or extending too far down into the inlet 10. As shown in FIG. 2, the body member 12 may be stood in an upright position adjacent the inlet 10. Alternatively, as shown in FIG. 3, the body member 12 may be placed in a lying down position directly on top of the inlet 10 such that the hose receiving opening 26 is aligned with the inlet 10. In the position of FIG. 3, the hose stabilizing device 2 provides the additional benefit of acting as a cap for the inlet which reducing the amount of odor which may emit therefrom.

Figure 7:
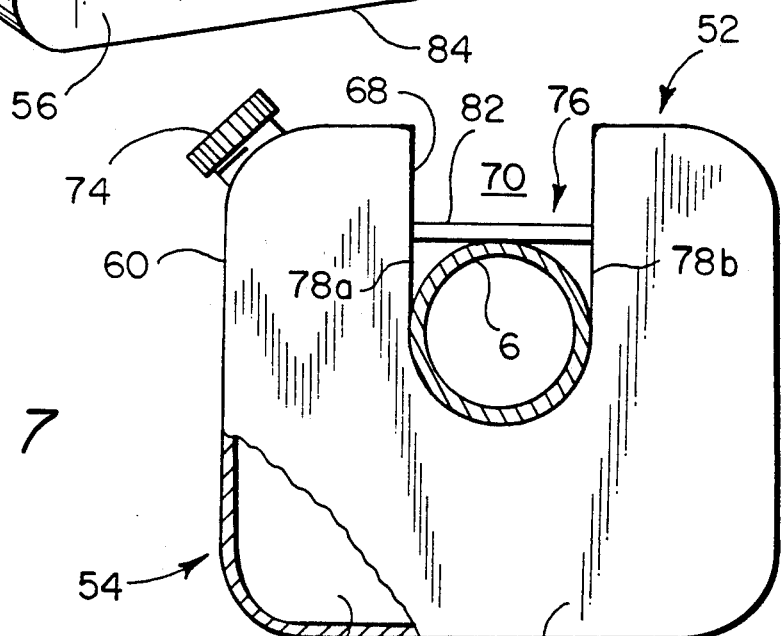
FIG. 7 is a side elevational view, partially in section, of the device of FIG. 6 with a hose locked therein.
Figure 8:
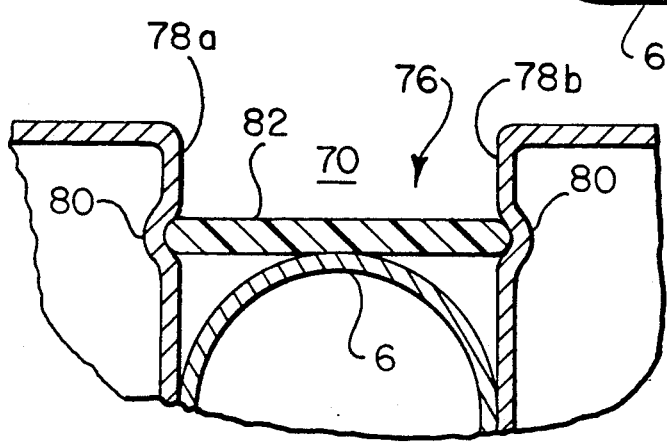
FIG. 8 is an enlarged partial sectional view of the device shown in FIG. 7.

Referring now more particularly to FIGS. 6–8, there is shown an alternative embodiment of the present invention which may also effectively be used to securely maintain the end 4 of a sewage hose 6 in proper communication with a sewage receiving inlet 10 in the manner described above. The hose stabilizing device 52 includes a body member 54 which has spaced front, back and side wall portions 56, 58 and 60, respectively, which define an internal chamber 62 therebetween. The body member includes a cutout portion 68 which defines a hose receiving opening 70 in the body member 54. Preferably, the hose receiving opening 70 has a substantially U-shaped configuration and extends into the body member 54 a distance which is greater than the diameter of the hose 6 which will be supported therein.

Preferably, the walls of the hose receiving opening 70 may have a shape which corresponds to the shape of the outer surface of the hose 6. For example, for use with a corrugated or ribbed-type hose, the walls of the opening 70 may have a corresponding corrugated or ribbed shape, thereby providing improved gripping of the hose 6 therein. Preferably, the cutout portion 68 includes a plurality of rib members 86 on the lower portion thereof for maintaining the hose 6 therein.

A filler opening 72 and cooperating closure cap 74 are provided for enabling the internal chamber 62 to be filled with a ballast material as discussed above. The body member 54 includes a flat portion 84 thereon which enables the body member 54 to stand upright on the flat portion.

The hose stabilizing device 52 further includes means 76 for locking the hose 6 in the hose receiving opening 70. The locking means 76 is operable to be moved to an open position, as shown in FIG. 6, wherein the hose 6 may be placed in the hose receiving opening 70, and a closed position, as shown in FIGS. 7 and 8, wherein the hose 6 is clampingly held in the hose receiving opening 70 between the locking means 76 and the body member 54.

Preferably, the cutout portion 68 includes a pair of opposed inner side walls 78a and 78b, and said locking means 76 includes an indent portion 80 on each of said inner side walls 78a and 78b and a cooperating locking member 82 having a pair of opposed end portions which are operable to be received in said indent portions 80, respectively. Preferably, the locking member 82 is a rod-like member, but any other suitable member or locking means which is operable to lock the hose 6 in the hose receiving opening 70 may be used.

Preferably, the locking member 82 has a length which enables the locking member to snap fit in the indents 80. Positioning of the locking member 82 in the indents 80 is most effectively achieved by placing one end of the locking member 82 in one of the indents 80 and then forcing, by hand, the other end thereof into the other indent 80. The length of the locking member 82 should be such that it securely remains in the locked position when forced therein, but is also easily removable by hand by applying an upward force to one end of the locking member 82.

The indents 80 are preferably positioned on the inner side walls 78a and 78b at location which is approximately equal to the position of the top of the hose 6 when placed therein, so that the locking member 82 acts to clamp down on the hose 6, when in the locking position of FIGS. 7 and 8, with a force which securely maintains the hose 6 therein but does not damage the hose.

Preferably, the body member 54, rib members 86, indents 80 and filler opening 72 are all integrally formed of synthetic plastic material, but any other suitable material may be used. The locking member 82 may also be made of a plastic material or the like. The locking member 82 is substantially rigid, but may be slightly resilient to facilitate moving the locking member 82 in and out of the locking position.

The alternative embodiment as shown in FIGS. 6–9 has a similar operation and function as that of FIGS. 1–5 described above.

While in accordance with the patent statute, the preferred forms and embodiments of the invention have been illustrated and described, it will be apparent to those of ordinary skill in the art that various changes and modifications may be made without deviating from the inventive concepts set forth above.

What is claimed is:

1. Stabilizing device for a hose, comprising a body member including a pair of body portions each having spaced front, back, inner and outer wall portions, said body portions each having a complementary cutout portion adjacent said inner wall portion thereof which together define a hose receiving opening in said body member, means for pivotally connecting said pair of body portions together, such that said body member is selectively pivotable between an open condition, wherein the hose may be placed between said body portions, and a closed condition, wherein said hose is clampingly held therebetween in said hose receiving opening, and further wherein at least one of said body portions includes an internal chamber therein and means for enabling said internal chamber thereof to receive and hold a ballast material therein, thereby providing weight for stabilizing the hose.

2. Device as defined in claim 1, and further including means for selectively locking said body member in said closed condition.

3. Device as defined in claim 1, and further including handle means secured to said body member.

4. Device as defined in claim 1, wherein said hose receiving opening has a slightly smaller diameter than the diameter of the hose, thereby enabling said body member to securely clamp onto the hose.

5. Device as defined in claim 4, wherein said opening has a diameter which is approximately one-eighth to one-quarter of an inch smaller than that of the hose.

6. Device as defined in claim 1, wherein said pair of body portions are substantially identical in size and shape 7. Device as defined in claim 6, wherein said hose receiving opening is circular, and further wherein each of said cutout portions defines approximately half of said circular opening.

8. Device as defined in claim 1, wherein said hose receiving opening is substantially centrally located in said body member.

9. Device as defined in claim 1, wherein each of said body portions includes an internal chamber therein and means for enabling said internal chamber thereof to receive and hold a ballast material therein.

10. Device as defined in claim 1, wherein said internal chamber is a liquid-tight chamber, thereby enabling said liquid-tight chamber to receive and hold a liquid ballast material therein.

11. Device as defined in claim 1, wherein said body member includes at least one perimeter portion which is flat, thereby enabling said body member to stand upright on said flat perimeter portion.

12. Device as defined in claim 1, wherein each of said body portions is shaped as a polygon.

13. Device as defined in claim 12, wherein said body member is shaped as an octagon.

14. Stabilizing device for a hose, comprising a body member, having spaced front, back and side wall portions, said body member having a cutout portion adjacent said side wall portion thereof which defines a hose receiving opening which extends from said side wall portion into in said body member, means for locking the hose in said hose receiving opening, wherein said locking means is operable to be moved between an open position wherein the hose may be placed in said hose receiving opening, and a closed position, wherein the hose is clampingly held in said hose receiving opening between said holding means and said body member, and further wherein said body portion includes an internal chamber therein and means for enabling said internal chamber thereof to receive and hold a ballast material therein, thereby providing weight for stabilizing the hose.

15. Device as defined in claim 14, wherein said cutout portion includes a pair of opposed inner side walls, and said locking means includes an indent portion on each of said inner side walls and a cooperating locking member having a pair of opposed end portions which are operable to be received in said indent portions, respectively.

16. Device as defined in claim 15, wherein said locking member is a substantially rigid rod-like member.

17. Device as defined in claim 14, wherein said cutout portion includes at least one rib member thereon which is operable to cooperate with ribs on a corrugated hose placed in said hose receiving opening to maintain the hose therein.

18. Device as defined in claim 15, wherein said locking member has a length which enables said locking member to be snap-fit into said indent portions.

19. Device as defined in claim 14, wherein said cutout portion extends into said body member a distance which is greater than the diameter of the hose.

20. Device as defined in claim 14, wherein said body member includes a flat portion thereon which enables said body member to stand upright on said flat portion.

21. Device as defined in claim 14, wherein said cutout portion extends from the perimeter of said body member and is substantially U-shaped.

22. Device for maintaining the end of a recreational vehicle sewage hose in proper communication with a sewage receiving inlet, comprising a body member including a pair of body portions each having a complementary cutout portion therein which together define a sewage hose receiving opening in said body member, means for pivotally connecting said pair of body portions together, such that said body member is selectively pivotable between an open condition, wherein the sewage hose may be placed between said body portions, and a closed condition, wherein the sewage hose is clampingly held therebetween in said sewage hose receiving opening, and further wherein said body member includes weight means for stabilizing said body member and maintaining the sewage hose in proper communication with the sewage receiving inlet by preventing the sewage hose from coming out of and extending too far into the sewage receiving inlet.

23. Device as defined in claim 22, wherein said weight means includes at least four pounds of material within said body member.

* * * * *